US006493695B1

(12) United States Patent
Pickering et al.

(10) Patent No.: US 6,493,695 B1
(45) Date of Patent: Dec. 10, 2002

(54) METHODS AND SYSTEMS FOR HOMOGENEOUSLY ROUTING AND/OR QUEUEING CALL CENTER CUSTOMER INTERACTIONS ACROSS MEDIA TYPES

(75) Inventors: David Pickering, Oakland, CA (US); Narasimhaprasad Kodur, Cupertino, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/407,791

(22) Filed: Sep. 29, 1999

(51) Int. Cl.[7] .............................................. G06F 17/00
(52) U.S. Cl. .............................. 706/47; 706/45; 706/46
(58) Field of Search ............................... 706/45, 47, 46

(56) References Cited

U.S. PATENT DOCUMENTS 5,862,325 A * 1/1999 Reed et al. .................. 709/201

OTHER PUBLICATIONS

Agent Management Technology in a Ruled–Based Electronic Collaboration System, Yong Mu; Technical Report Vision Interfaces and System Laboratory (No. VISLab. 97002).*
Call Centres (opportunities for HLT in the next 5 years) Summary of a Linglink Report for European Commission DGXIII, Jeremy Peckham; (Nov. 16, 1998).*
Agent Management Technology in a Ruled–Based Electronic Collaboration System, Technical Report (No. VIS-Lab.97002), Yong Mu (1997).*

* cited by examiner

Primary Examiner—Thomas Black
Assistant Examiner—Michael B. Holmes
(74) Attorney, Agent, or Firm—Young Law Firm, P.C.

(57) ABSTRACT

Methods, devices and systems for processing a customer interaction of any media type for assignment to at least one selected call center agent and/or to at least one selected queue coupled to at least one call center agent in a call center. The method includes steps of receiving the customer interaction and extracting customer data from the received customer interaction. The customer data is linked with the customer interaction from which the customer data was extracted. The extracted customer data is stored in a data structure that is generic across all media types of the customer interactions. The customer data in the generic data structure is then applied to a rule-based engine, the rule-based engine operating upon the extracted customer data to select the agent(s) and/or the queue(s) to which to assign the generic data structure. A repository of call center agent characteristics may be accessed to select the agent(s) and/or queue(s), as may be a customer information database. The generic data structure or object is assigned and sent to the selected agent(s) and/or to the selected queue(s), and the customer interaction linked to the generic data structure is retrieved. At least the retrieved customer interaction may then be presented to the selected agent(s) on a display and/or teleset.

38 Claims, 5 Drawing Sheets

Generic Data Structure (Object) Field, Description

Name, The name of the interaction
ID, The ID of the interaction.
CallID, The ID of the call involved in the interaction
ANI, The Automated Number Identification. The telephone address of the calling party.
DNIS, The Dialed Number Information Service, The number that the calling party dialed
CallBirth,Time and date of the interaction
ContactNum, A string identifying the contact number of the customer
ContractNum, A string identifying the customer's contract
CustomerID , Customer's ID number
CustomerNum, A string identifying the customer
CustomerName, The name of the customer
CustomerProductID, The customer's product ID number
InventoryItemID, The customer's inventory item number
InvoiceNum, The customer's invoice number
LotNum, The customer's lot number
OrderNum, The customer's order number
ProductName, The name of the Product
PurchaseOrderNum, The purchase order number
ReferenceNum, The reference number
RevisionNum, The revision number of the product
RMANum, The customer's Return Material Authorization number
ScreenPopType, A string identifying the type of screen-pop to launch
SerialNum, The serial number
ServiceRequestNum, The service request number
SystemName, A string identifying the system involved
AccountCode, A string identifying the customer's account
PreferredID, The customer's Preferred ID number
PromotionCode, A string identifying the promotion in which a customer is interested
QuoteNum, A string identifying the quote in which a customer is interested
InteractionMethod,Used to identify the method of interaction
CallTypeCode, A constant describing the type of outbound call
TimeZone, The application-defined time zone value for this customer ID
CallStatus, The termination status of the call; for example, voice or answering machine
RingCount, The number of times the phone rang
ReturnEmailAddr, The return email address of the customer
BrowserType, The type of browser used by customer
BrowserVer, The version of the browser used by customer
ServiceLevel, The service level to render to customer, e.g., Silver, Gold, Platinum
CustLanguage, The customer's language

METHODS AND SYSTEMS FOR HOMOGENEOUSLY ROUTING AND/OR QUEUEING CALL CENTER CUSTOMER INTERACTIONS ACROSS MEDIA TYPES

BACKGROUND OF THE INVENTION

1. Field of the Invention

This invention relates to methods and systems for processing customer interactions such as may occur in a customer service call center. Specifically, the present invention relates to methods and systems for uniformly processing call center customer interactions across all media types such as e-mail, facsimile, telephone and the like to assign and send the processed customer interactions to one or more call center agents and/or call center agent queues.

2. Description of the Related Art

Figure 1:
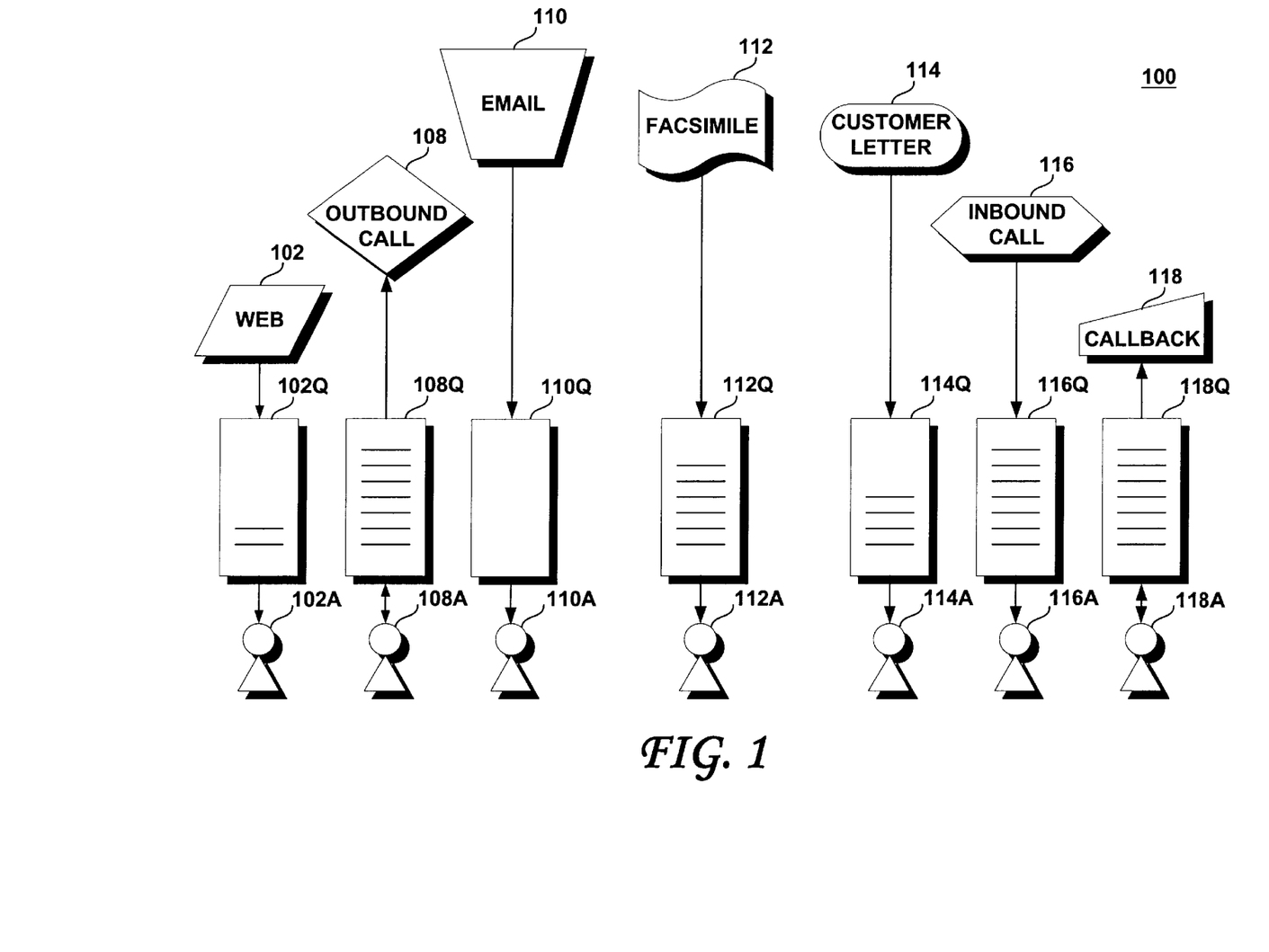
FIG. 1 is a block diagram of a call center receiving a variety of customer-related communications.

FIG. 1 is a block diagram of the organization and operation of a call center 100 receiving and originating a variety of customer-related communications. Call centers such as shown at 100 in FIG. 1 conventionally feature a large group of agents 102A, 108A, 110A, 112A, 114A, 116A and 118A handling inbound calls 116 (order taking, billing inquiries, technical support requests, for example), outbound calls 108 and callbacks 118 (telesales, for example) or both. Such a call center 100 may also handle inbound or outbound communications over media other than the telephone, such as facsimile (faxed) communications 112, communications 102 originating from the World Wide Web (hereafter "Web"), email communications 110 and/or customer letters, as shown at 114. Such customer communications may be assigned to the first available agent that handles such communications. While waiting for such first available agent, the communications may be stored in a queue, which may be thought of as a holding place and an organizational structure to hold communications. Typically, there is one queue for each media type. Indeed, there may be one queue 102Q for Web-based communications 102, one queue 112Q holding faxed communications 112, one queue 110Q holding emailed communications 110, one queue 116Q for telephone inbound customer communications and other queues 108Q, 118Q for outbound, agent-originated communications 108 and callbacks 118. In the case of a customer letter 114, the corresponding queue 114Q may be a simple physical inbox where the customer letters 114 are deposited while waiting for action from an agent 114A. Communications may be removed from such queues 102Q, 108Q, 110Q, 112Q, 114Q, 116Q and 118Q by corresponding call center agents 102A, 108A, 110A, 112A, 114A, 116A and 118A respectively, on a first-in first-out basis or may be prioritized according to a predetermined service level, for example.

Conventionally, a separate system handles (receives, processes, routes, queues and sends out, for example) each different media type. For example, one system handles incoming and outgoing telephone calls 116, 108, another system handles emails 110, another handles Web-based customer communications 102, while another separate system may handle faxed communications 112. Such separate have thus far been necessary as the email system, for example, does not "know" how to handle telephone calls and the Web system does not "know" how to handle facsimile communications 112. Indeed, each system is only equipped to handle a specific media type, as each media type is formatted differently. The consequence of such a fragmented approach to customer-related communications is that separate agents 102A, 108A, 110A, 112A, 114A, 116A and 118A are needed to handle Web communications 102, outbound calls 108, email communications 110, facsimile communications 112, customer letter 114, in bound calls 116 and callbacks 118, respectively. Each agent 102A, 108A, 110A, 112A, 114A, 116A and 118A, therefore, plucks the next available communication from queues 102Q, 108Q, 110Q, 112Q, 114Q, 116Q and 118Q specific to a single media type. For example, the Web customer agent 102Q only plucks communications from the Web queue 102Q, the email call center agent 110A only retrieves communications from the email queue 110Q and so on. In turn, this entails that the workload of the agents 102A, 108A, 110A, 112A, 114A, 116A and 118A may vary widely, depending upon the most prevalent media in the queues 102Q, 108Q, 110Q, 112Q, 114Q, 116Q and 118Q at any given time. For example, the telephone call center agents 108A, 116A and 118A may be overworked (as their respective queues 108Q, 116Q and 118Q are full), while the email call center agents 110A sit idle, for lack of requests in their email-only queue 110Q. However, when separate systems administer queues 102Q, 108Q, 110Q, 112Q, 114Q, 116Q and 118Q and routing (i.e., assigning and sending the communication to selected agent (s) and/or queues) for each different media type, it is not possible to re-route some of the customer communications of one media type to a system handling only communications of another media type. For example, inbound calls 116 normally routed and/or queued by the inbound call system to the inbound call-only agent 116A and/or the inbound call-only queue 116Q may not be re-routed and/or queued to the idle email call center agents 110A and/or queue 110Q, as the inbound call-only system is not equipped to handle an email communication 110. Such separate systems, although effective to handle a single well-defined media type, have arguably become an artificial technologically based barrier to human interaction.

In an increasingly multimedia electronic marketplace where orders and support requests, for example, may be placed in a variety of different media, such separate systems increasingly constitute a liability (both in terms of cost and functionality) and hamper the call center's ability to effectively handle a large volume of calls and customer communications in a timely manner. Ultimately, the operating costs of the call center increases and the customers suffer from less than optimal quality of service. There has been a long felt need, therefore, for methods and systems that would allow call centers to have greater flexibility in the manner in which they handle customer communications. What are needed, specifically, are methods and systems that would allow call centers to handle all customer communications in a homogeneous manner, across all media types. Such a system should allow the call center to make optimum use of its existing material and human resources by increasing the flexibility of its queuing and routing systems and by allowing, for example, previously idle email agents 110A to handle incoming Web-based or facsimile communications 102, 112.

SUMMARY OF THE INVENTION

It is an object of the present invention, therefore, to provide methods, devices and systems that that would allow call centers to have greater flexibility in the manner in which they handle customer communications. It is a further object to provide methods and systems that would allow call centers to handle all customer communications in a homogeneous manner, across all media types, to thereby allow the call center to make optimum use of its existing material and human resources.

In accordance with the above-described objects and those that will be mentioned and will become apparent below, a method for processing a customer interaction of any media type for assignment to at least one selected agent or to at least one selected queue coupled to at least one agent, according to an embodiment of the present invention, comprises steps of receiving the customer interaction, extracting customer data from the received customer interaction and linking the customer data with the customer interaction from which the customer data was extracted. The customer data is stored in a data structure that is generic across all media types of the customer interactions. The customer data in the generic data structure is applied to a rule-based engine, the rule-based engine operating upon the extracted customer data to select the one or more agents and/or one or more queues to which to assign the generic data structure. The generic data structure or object is then assigned and sent to the selected agent(s) and/or to queue(s) and the customer interaction linked to the generic data structure is retrieved. At least the retrieved customer interaction is then presented to selected agent(s).

According to further embodiments, the incoming customer interaction originates from a group of media types including e-mail, facsimile, telephone, Word Wide Web and written letter. The applying step may cause the rule-based engine to access a repository (such as a database) of agent characteristics, the rule-based engine selecting the at least one agent or the at least one queue by matching the customer data to the agent characteristics. The agent characteristics may include one or more criteria such as the agent's availability, skill sets, proficiency, languages spoken and experience. The extracting step may extract customer data by collecting at least one of Interactive Voice Response (IVR) data, Automatic Number Identification (ANI) data, call arrival time, CallerID data, Dialed Number Identification Service (DNIS) when the media type of the received customer interaction is a telephone call. The extracting step may extract customer data from a Web page accessed by a customer, when the media type of the received customer interaction includes a World Wide Web page. Similarly, the extracting step may extract customer data from an email sent by a customer, when the media type of the received customer interaction includes an email. A step of accessing customer information based upon the extracted customer data may also be carried out, the customer information being stored in a customer information database. The customer information database may store at least one of a customer account number, name, contact information, interaction history, level of service to render, payment information and sales information. The presenting step may include a step of presenting the accessed customer information, interaction history, level of service to render, payment information and sales information. The presenting step may include a step of presenting the accessed customer information to the selected agent(s) along with the retrieved customer interaction. The generic data structure may include one or more fields associated with each media type and the storing step may selectively populate one or more of such fields with the extracted customer data. A task to be performed by one or more agents may be substituted for the customer interaction and task data may be substituted for the customer data, the agent task thereby being assigned to the selected agent(s). The generic data structure may be removed from the queue(s) when the retrieved customer interaction is presented to the selected agent(s).

According to another embodiment, the present invention is a computer system, comprising at least one processor; at least one data storage device and a plurality of processes spawned by the at least one processor, the processes including processing logic for processing a customer interaction of any media type for assignment to one or more selected call center agents and/or one or more selected queues coupled to at least one call center agent in a call center. The processing logic defines the steps of receiving the customer interaction; extracting customer data from the received customer interaction and linking the customer data with the customer interaction from which the customer data was extracted; storing the customer data in a data structure that is generic across all media types of the customer interactions; applying the customer data in the generic data structure to a rule-based engine, the rule-based engine operating upon the extracted customer data to select the agent(s) and/or the queue(s) to which to assign the generic data structure; assigning and sending the generic data structure to the selected agent(s) and/or to the queue(s); retrieving the customer interaction linked to the generic data structure, and presenting the retrieved customer interaction to the selected agent(s).

According to a still further embodiment, the present invention is a machine-readable medium having data stored thereon representing sequences of instructions which, when executed by a call center computer, causes said computer to process a customer interaction of any media type for assignment to one or more selected agents and/or to one or more selected queues coupled to at least one agent of a call center by performing the steps of receiving the customer interaction; extracting customer data from the received customer interaction and linking the customer data with the customer interaction from which the customer data was extracted; storing the customer data in a data structure that is generic across all media types of the customer interactions; applying the customer data in the generic data structure to a rule-based engine, the rule-based engine operating upon the extracted customer data to select the agent(s) and/or the queue(s) to which to assign the generic data structure; assigning and sending the generic data structure to the selected agent(s) and/or to the queue(s); retrieving the customer interaction linked to the generic data structure, and presenting the retrieved customer interaction to the selected agent(s).

BRIEF DESCRIPTION OF THE DRAWINGS

For a further understanding of the objects and advantages of the present invention, reference should be made to the following detailed description, taken in conjunction with the accompanying figures, in which:

FIG. 4 is a diagram of representative fields of a generic data structure for storing extracted customer data, according to an embodiment of the present invention.

DESCRIPTION OF THE PREFERRED EMBODIMENTS

Functional Overview

Figure 2:
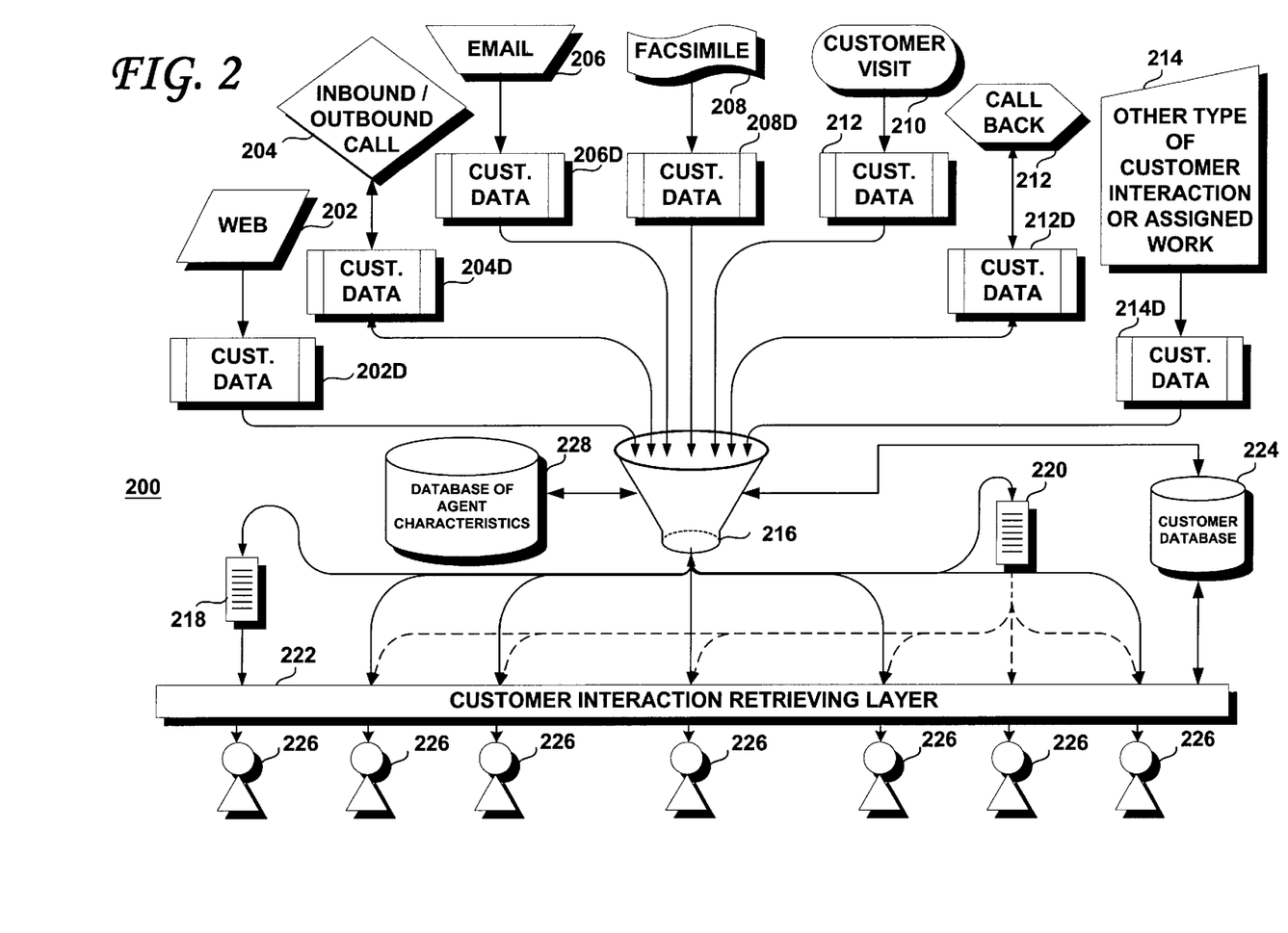
FIG. 2 is a block diagram of the organization and operation of a call center that processes incoming customer interactions of any media type for assignment to one or more selected queues and/or agents, according to an embodiment of the present invention.

FIG. 2 is a functional block diagram of the organization and operation of a call center that processes incoming customer interactions of any media type for assignment to one or more selected agents and/or queues, according to an embodiment of the present invention. As shown therein, the call center 200 sends and receives a plurality of communications to and from customers. These customer communications are sent from and arrive to the call center 200 in a variety of different media, such as Web-based communications, inbound, outbound or callback telephone calls, emails, facsimiles, customer visits and/or other media.

One important function of the call center 200 is to efficiently route each customer communication to a selected agent 226, whereupon the agent 226 answers the customer's questions and/or provides the requested service. A customer communication may be routed to a selected one of the agents 226 or may be queued in one or more queues 218, 220 if no appropriate agent 226 is currently available. The present invention processes all such customer communications in a homogeneous manner through the creation of a customer interaction class. The customer interaction class encompasses all customer communications, across all media types. The different media (Web, telephone, email, facsimile, etc) of such a customer interaction may then be thought of as sub-classes of such a customer interaction class. The customer interaction class, as shown in FIG. 2, encompasses customer interactions referenced by numerals 202, 204, 206, 208, 210, 212 and 214. The customer interaction 202, therefore, belongs to the "Web" sub-class, whereas the customer interaction 206 belongs to the "Email" sub-class and the customer interaction 208 belongs to the "Facsimile" subclass.

To allow each sub-class of customer interaction to be processed by the call center 200 in the same or a similar manner requires that some transformation be carried out on the customer interaction. This transformation, according to the present invention, includes the extraction of customer data from each (incoming or outgoing) customer interaction and the storing of such customer data in a data structure that is generic across all customer interaction media types. This customer data, according to the present invention, is extracted (e.g., parsed and stripped) from the customer interaction. For example, the customer data may include information such as a customer's name, telephone number, account number and the like. Such customer data is often contained in or may be obtained from the customer interaction itself and/or may be obtained contemporaneously and interactively from the customer. According to the present invention, this customer data is then stored in a data structure or within an object that is generic across all subclasses—that is, across all media types of customer interactions. This generic data structure is represented in FIG. 2 as the boxes labeled "CUST. DATA" and including the "D" suffix.

The generic data structure 202D, for example, includes customer data extracted from the Web customer interaction 202. For example, a Java bean may be created and placed on a web server (not shown) within the call center 200. The relevant web application may then automatically identify the customer and selectively populate appropriate fields of the generic data structure or object 202D through the Java bean or allow the customer to enter the relevant information him or herself, though their Web browser, for example. In principle, anything on a Web page may be extracted and used to populate selected fields in the generic data structure or object 202D. The customer data may be extracted from an inbound telephone call 204, for example, by means of such existing systems as the Automatic Number Identification (ANI) system, which identifies the calling party's telephone number to the telephone of the receiving party.

The generic data structures or objects 202D, 204D, 206D, 208D, 210D, 212D and 214D each have the same structure. The constituent fields of such a generic data structure, according to the present invention, may include fields that are present in all or most of the customer interactions and may also include fields that are specific to the particular customer interaction subclass at hand; that is, particular to the particular media of the customer interaction. For example, the generic data structure or objects 202D, 204D, 206D, 208D, 210D, 212D and 214D may include a field for the customer account number. The customer account number is a field that is likely to be present in each customer interaction 202, 204, 206, 208, 210, 212 and 214, irrespective of the media of such interaction. Indeed, Web, email, telephone or facsimile customer interactions are each likely to include the customer's account number. Other fields within the generic data structures 202D, 204D, 206D, 208D, 210D, 212D and 214D may be specific to one or more customer interactions and/or media types. For example, the customer's telephone number may be extracted from the customer interaction 204 by an ANI service when the media of the customer interaction is the telephone (reference 204), but may not be extracted when the media of the customer interaction is email, as shown at 206. Likewise, the customer's email address may readily be extracted from an email customer interaction 206, but may not be available from an interaction wherein the media is other than email, such as a facsimile customer interaction 208.

The generic data structure 202D, 204D, 206D, 208D, 210D, 212D or 214D is, therefore, generic across all media types and includes at least one field associated with each type of media. The customer data extracted from each customer interaction 202, 204, 206, 208, 210, 212 or 214, according to the present invention, is stored in a single such generic data structure 202D, 204D, 206D, 208D, 210D, 212D or 214D by selectively populating at least one of the constituent fields thereof. For example, a call center email application having received an email 206 from a customer may extract email-specific customer data from the received email customer interaction 206 and store the extracted customer data in a generic structure such as shown at reference 206D. The extracted customer data may include such email-specific data as the customer's return email address and/or may include data that is generic to all or most customer interactions 202, 204, 206, 208, 210, 212 or 214, such as the customer's account number or name. The generic data structures 202D, 204D, 206D, 208D, 210D, 212D and 214D in which the customer data have been stored are then linked back to their corresponding customer interaction 202, 204, 206, 208, 210, 212 or 214, to provide a mechanism by which the customer interaction may be retrieved after the generic data structure 202D, 204D, 206D, 208D, 210D, 212D or 214D has been processed. Such linking may take the form of, for example, a pointer that points back to an address where the customer interaction 202, 204, 206, 208, 210, 212 or 214 is stored. For example, the generic data structure 206D that stores the customer data extracted from the email customer interaction 206, according to an embodiment of the present invention, may include a pointer or some other means of linking the generic data structure or object 206D back to its corresponding customer interaction 206.

The extraction of customer data from the customer interactions 202, 204, 206, 208, 210, 212 and 214 and the storage thereof in the generic data structures 202D, 204D, 206D, 208D, 210D, 212D and 214D allows the customer interactions to be queued and/or routed in a uniform manner, across media types. In turn, this standardization of the customer data allows call centers to abstract away from specific media types such as telephone calls, emails facsimiles and the like and treat all such events as customer interactions. For example, using the generic data structures or objects 202D, 204D, 206D, 208D, 210D, 212D and 214D, the call center 200 may apply the same or similar routing and/or queueing rules to the customer interactions 202, 204, 206, 208, 210, 212 and 214 and assign and send the generic data structures 202D, 204D, 206D, 208D, 210D, 212D and 214D to one or more selected agents 226 and/or queues 218, 220, without regard to the media of the associated customer interactions 202, 204, 206, 208, 210, 212 and 214. Similarly, the standardization of the customer data through the use of the generic data structures or objects 202D, 204D, 206D, 208D, 210D, 212D and 214D allows the call center 200 to blend and queue customer data in a single queue, which may then be termed a universal media queue.

Specifically, the blending of media types through the use of generic data structures or objects 202D, 204D, 206D, 208D, 210D, 212D and 214D allows a routing module, such as shown at reference 216 in FIG. 2, to apply the same routing and/or queueing rules to customer data associated with customer interactions 202, 204, 206, 208, 210, 212 and 214 of differing media types. Indeed, the routing module 216 may include a rule based routing engine, the rule based routing engine operating upon the customer data extracted from the customer interactions 202, 204, 206, 208, 210, 212 and 214 and stored in the generic structures or objects 202D, 204D, 206D, 208D, 210D, 212D and 214D to select one or more agents 216 and/or one or more queues 218, 220 to which to assign and send each of the generic data structures 202D, 204D, 206D, 208D, 210D, 212D and 214D. The routing module 216 may access a workforce management database 228 to select the agent(s) 206 and/or the queue(s) 218, 220 to which to assign and send the generic data structures 202D, 204D, 206D, 208D, 210D, 212D and 214D, based upon the customer data stored therein. The workforce management 228 may act as a repository of agent characteristics, such as skill sets, experience, performance, language proficiencies etc. The rule-based engine within the routing module 216 may include a plurality of rules that determine how a particular generic data structure 202D, 204D, 206D, 208D, 210D, 212D and 214D will be routed and/or queued. These rules may be predetermined and/or customizable to adapt the functionality of the routing module 216 to the needs of the business operating the call center 200. The rules within the rule-based engine may functionally take the form of independent and/or interdependent "if, then" statements, for example. In this manner, the routing module 216 may apply the rule "if the customer interaction is in Spanish, then route the interaction to Spanish speaking agents 226", without regards to the media thereof. That is, the same Spanish-speaking agent 226 or group of Spanish-speaking agents 226 may handle the customer interaction, without regard to the media of the interaction. That is, as long as the agent 226 can read and speak Spanish, such an agent 226 can handle any Spanish-language customer interaction 202, 204, 206, 208, 210, 212 or 214, irrespective of whether the interaction is a telephone call, an email, a fax, a customer visit, or a letter, for example. The rules within the rule-based engine of the routing module 216 may work in concert to efficiently route and/or queue customer interactions 202, 204, 206, 208, 210, 212 and 214. For example, rules may be devised to route and/or queue all after hours interactions from high net worth Spanish speaking customers to the most highly trained third shift Spanish speaking agents 226, irrespective of whether the interaction in question is a facsimile, email or telephone call, for example. Routing and/or queueing of generic data structures or objects 202D, 204D, 206D, 208D, 210D, 212D or 214D, therefore, may be carried out on the basis of agent skills, groups, time, location, site, records, availability, other agent characteristics and/or a combination of the above. To insure that each customer interaction 202, 204, 206, 208, 210, 212 or 214 is properly routed and/or queued, default queueing and/or routing rules may be included in the routing module 216.

The routing module 216 may route (assign and send) the generic data structures or objects 202D, 204D, 206D, 208D, 210D, 212D or 214D to one or more queues 218, 220 and/or to one or more selected agents 226. It is to be noted that although only two such queues 218, 220 are shown in FIG. 2, any number of such queues are supported by the present invention. Queues may be coupled to a single agent 226 as shown at 218, wherein the arrow from the queue 218 points to a single agent 226. Alternatively, queues may be coupled to a plurality of agents 226 such as shown at 220, wherein the queue 220 feeds a plurality of agents 226, as indicated by the arrows in dashed lines leading from the queue 220. The generic data structures or objects 202D, 204D, 206D, 208D, 210D, 212D and 214D may be directly routed to one or more individual agents 226, bypassing any queue that may exist therebetween.

After each generic data structure or object 202D, 204D, 206D, 208D, 210D, 212D or 214D is assigned to the appropriate queue(s) 218, 220 and/or agent(s) 226, the customer interaction 202, 204, 206, 208, 210, 212 or 214 linked thereto is retrieved by the customer interaction retrieving layer 222. That is, the pointer to the customer interaction 202, 204, 206, 208, 210, 212 or 214 within the data structure or object 202D, 204D, 206D, 208D, 210D, 212D or 214D is used to retrieve the customer interaction 202, 204, 206, 208, 210, 212 or 214 at the address indicated to by the pointer or other interaction retrieving mechanism. The retrieved customer interaction 202, 204, 206, 208, 210, 212 or 214 may then be presented to one or more of the agents 226 on his or her computer screen and/or teleset, for example. Along with the customer interaction 202, 204, 206, 208, 210, 212 or 214 presented to the agent 226, the customer interaction retrieving layer 222 or some functionally similar layer may access a database of customer information, based upon the extracted customer data stored in the generic data structures or objects 202D, 204D, 206D, 208D, 210D, 212D or 214D. Alternatively, the routing module 216 may access this database of customer information 224 and apply the accessed information to the rules of the rules-based engine to select one or more queues 218, 220 and/or agents 226 to which to send the generic data structure 202D, 204D, 206D, 208D, 210D, 212D or 214D. The database of customer information 224 may include one or more of the following customer data: customer account number, name, contact information, interaction history, level of service to render, payment information and sales information, for example. The accessed customer information may be presented to the selected agent 226 simultaneously with the presentation of the customer interaction 202, 204, 206, 208, 210, 212 or 214 on his or her computer display and/or teleset. If the generic data structure 202D, 204D, 206D, 208D, 210D, 212D or 214D is still present in one or more queues 218, 220 after the associated customer interaction 202, 204, 206, 208, 210, 212 or 214 has been presented to the selected agent 226, the generic data structure 202D, 204D, 206D, 208D, 210D, 212D or 214D may be removed from the queue(s) 218, 220, to prevent another agent 226 from handling the same customer interaction.

An ANI may provide the basis for a screen pop of a customer interaction 202, 204, 206, 208, 210, 212 or 214 to the display of an agent 226. For example, the call center 200 may receive an inbound telephone call 204 from a customer that dials a toll free customer service line. The call center's Private Branch Exchange (PBX—a private digital telephone switch) or Automatic Call Distributor (ACD) detects the ANI and populates the corresponding field in the generic data structure or object 204D. After the routing module 216 has routed the structure to one or more queues 218, 220 and/or one or more agents 226, the customer interaction retrieving layer 222 may retrieve the customer's phone call, and carry out a database lookup within the customer database 224 to present the selected agent(s) 226 with the telephone call 204 together with any customer information retrieved from the customer database 224, such as details of the customer's account. Other systems allow the call center 200 to extract customer data from a telephone call 204. Such other systems include, for example, Dialed Number identification Service (DNIS) and Interactive Voice Response Units (IVRU). DNIS provides information on the number dialed by the calling party for use as routing information. The routing module 216 may use DNIS to route calls based upon service levels. For example, a company might offer "Platinum", "Gold" and "Silver" technical support service plans, each with a dedicated toll free line. The routing module 216 may prioritize such calls made to these toll free numbers, route the calls into appropriate queues 218, 220 or cause high level service plan calls to bubble upward within a queue 218, 220, bypassing lesser level customer interactions 202, 204, 206, 208, 210, 212 or 214. An IVRU, also referred to as an Interactive Voice Response (IVR) or Voice Response Unit (VRU) offers the ability to receive or dispense information. An IVRU might play a message prompting a caller for data entered via telephone touch tones and selectively populate fields within the generic data structure 202D, 204D, 206D, 208D, 210D, 212D or 214D for use by the routing module 216. For example, an IVRU may prompt the caller for a customer number, account number, trouble ticket number or information on the nature of the interaction.

The routing module 216 may perform record-based routing, for example, and the routing to one or more queues 218, 220 and/or one or more agents 226 may take place based upon customer information retrieved from the customer database 224. A trouble ticket number (extracted via IVRU, for example) for a case that already exists within the call center 200 may be stored within a generic data structure (such as 204D, for example) and may cause the routing module 216 to search the customer database 224 for the name of the agent 226 who initially handled the call, and the routing module 216 may route the interaction to that agent 226 or to a queue 218, 220 coupled to that agent 226. A call center 200 may divide its agents 226 into outbound and inbound agents within a selected media type or across media types. If the volume of inbound customer interactions 202, 204, 206, 208, 210, 212 or 214 threatens to overwhelm inbound agents 226, business rules within the rule-based engine of the routing module 216 may dictate routing some incoming interactions 202, 204, 206, 208, 210, 212 or 214 toward outbound agents 226. The rule-engine may also include rules governing escalating calls, and the routing module may provide a customizable escalation path for such interactions.

The storage of the customer data in a standard and generic data structure or object 202D, 204D, 206D, 208D, 210D, 212D or 214D allows greater functionality than normally associated with call center routing and/or queueing applications. Indeed, the call center administrator may assign tasks or work to one or more selected agents 226 (or to all of them) by inserting an interaction 214 into the call center workflow. The interaction 214 may include a task or job to be performed by one or more agents 226. Such a task may be related to customer interactions or may be entirely independent thereof. In this case, appropriate data may be included in the interaction 214, to be extracted and stored into the generic data structure or object 214D. This task may include, for example, a directive to all agents 226 to determine which customers have not called recently and initiate an outbound telephone sales interaction 204 therewith.

Figure 3:
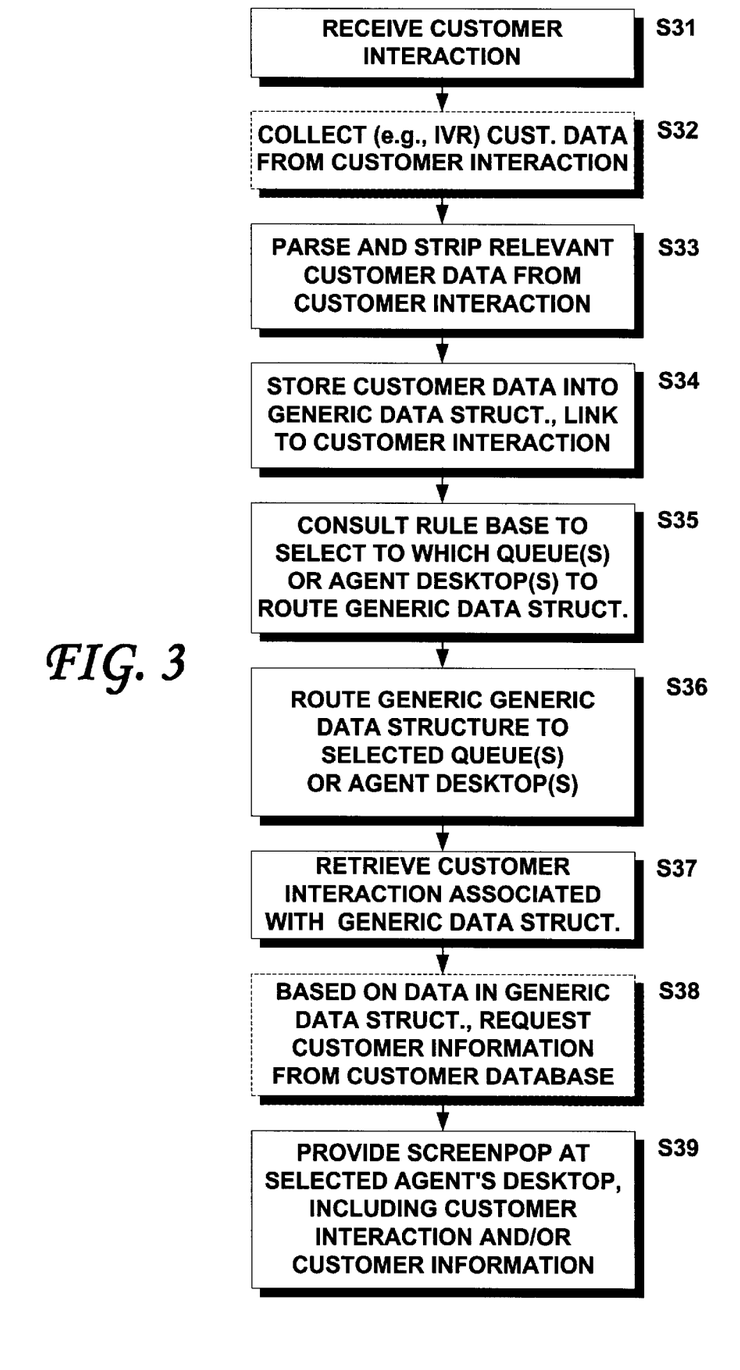
FIG. 3 is a flow diagram of an embodiment of the method according to the present invention.

FIG. 3 is a flowchart of a customer interaction processing method, according to an embodiment of the present invention. As shown therein, a customer interaction 202, 204, 206, 208, 210, 212 or 214 is received in step S31. Customer data may be collected via such mechanisms as IVRU or ANI or may be electronically scanned from the interaction itself, as shown at step S32. In the case of a customer interaction such as customer visit 210, such data may be collected, for example, by requesting that the customer fill out a form. Step S33 calls for the extraction, that is, the parsing and stripping of customer data from the interaction 202, 204, 206, 208, 210, 212 or 214, in the manner discussed above. In the case wherein the customer interaction is a letter, for example, the letter may be scanned and Optical Character Recognition (OCR) software may be applied thereto, to allow relevant data to be extracted therefrom. The extracted customer data is then stored in a generic data structure or object, as outlined in step S34 and as shown and described in detail relative to FIG. 1. The generic data structure or object is then linked back to its corresponding customer interaction, to allow later retrieval thereof, as also shown in step S34. In steps S35 and S36, a rule based engine in the routing module 216 is applied to the customer data in the generic data structure or object to select to which queue(s) 218, 220 and/or to which agent(s) 226 to route the generic data structure. The link (e.g., pointer) to the customer interaction within the generic data structure is then used to retrieve the customer interaction with which the routed generic data structure is associated, as shown in step S37. Based upon the customer data stored in the generic data structure, the routing module 216 and/or the customer interaction retrieving layer 222 may request customer information from the customer database 224, as shown in step S38. At least steps S32 and S38 may be omitted and are, therefore, shown in FIG. 3 in dashed lines. Step S39 calls for a screen pop (e.g., a presentation on the agent's display and/or teleset) of the retrieved customer interaction, optionally together with any customer information retrieved from the customer database 224. That is, the interaction and any other relevant and related information is presented to the selected agent 226, to allow the agent 226 to handle the interaction.

FIG. 4 shows an example of the constituent fields of a generic data structure 400, such as shown in FIG. 2 at 202D, 204D, 206D, 208D, 210D, 212D or 214D. Some fields within the structure 400 are appropriate for telephone-based customer interactions, while others are specific to other media types. Not all of the constituent fields of the generic data structure 400 will be populated with customer data in each customer interaction. Indeed, only those fields that are appropriate to the media type of the involved customer interaction will be populated at any given time. According to an illustrative embodiment of the present invention, the generic data structure may include the following fields: AgentName, The name of the interaction; AgentID, the ID of the Agent Object involved in the interaction; CallID, the ID of the call involved in the interaction; ANI, the Automated Number Identification—the telephone address of the calling party; DNIS, the Dialed Number Information Service, the number that the calling party dialed; CallBirth, the time and date of the interaction; ContactNum, a string identifying the contact number of the customer; ContractNum, a string identifying the customer's contract; CustomerD , the customer's ID number; CustomerNum, a string identifying the customer; CustomerName, the name of the customer; CustomerProductID, the customer's product ID number; InventoryItemID, the customer's inventory item number; InvoiceNum, the customer's invoice number; LotNum, the customer's lot number; OrderNum, the customer's order number; ProductName, the name of the product involved; PurchaseOrderNum, the purchase order number; ReferenceNum, the reference number; RevisionNum, the revision number of the product; RMANum, the customer's Return Material Authorization number; ScreenPopType, a string identifying the type of screen-pop to launch; SerialNum, the serial number; ServiceRequestNum, the service request number; SystemName, a string identifying the system involved; AccountCode, a string identifying the customer's account; PreferredID, the customer's Preferred ID number; PromotionCode, a string identifying the promotion in which a customer is interested; QuoteNum, a string identifying the quote in which a customer is interested; InteractionMethod,Used to identify the method or media of interaction; CallTypeCode, a constant describing the type of outbound call; TimeZone, the application-defined time zone value for this customer ID; CallStatus, the termination status of the call; for example, voice or answering machine; RingCount, the number of times the phone rang; ReturnEmailAddr, the return email address of the customer; BrowserType, the type of browser used by customer; BrowserVer, the version of the browser used by customer; ServiceLevel, the service level to render to customer, e.g., Silver, Gold, Platinum; CustLanguage, the customer's language. Other fields may be readily incorporated into the structure 400. Additionally, the structure 400 may include a pointer or some other functionally similar mechanism to retrieve the customer interaction associated with the generic data structure. Furthermore, the generic data structures or objects 202D, 204D, 206D, 208D, 210D, 212D or 214D may include business logic that allows the data structure itself to retrieve the associated customer interaction and/or perform other operations upon the extracted customer data and/or upon the customer information retrieved from the customer database 224.

Hardware Overview

Figure 5:
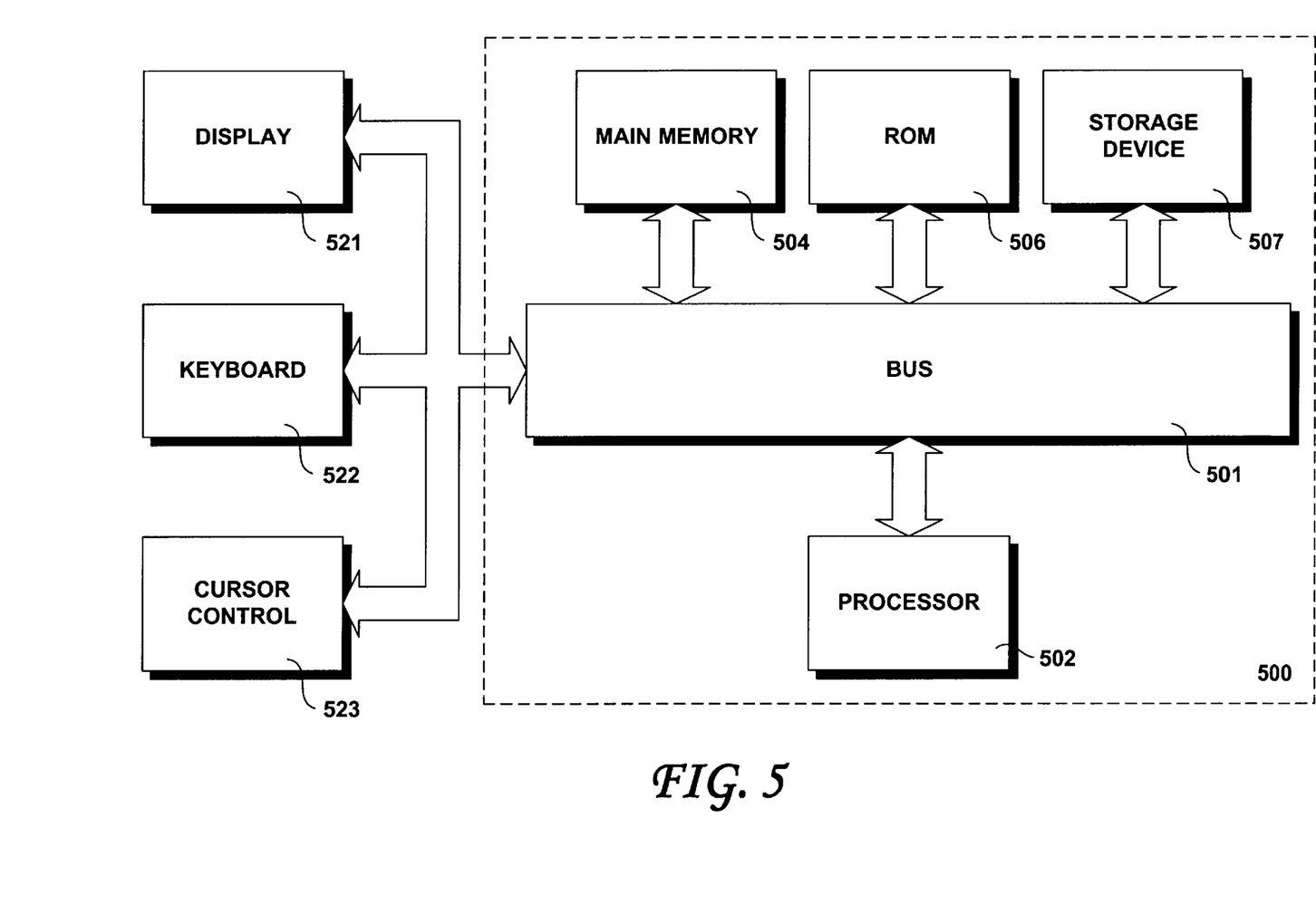
FIG. 5 is a block diagram of a computer.

FIG. 5 illustrates a block diagram of a computer 500 with which an embodiment of the present invention may be implemented. Computer system 500 includes a bus 501 or other communication mechanism for communicating information, and a processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also includes a read only memory (ROM) and/or other static storage device 506 coupled to bus 501 for storing static information and instructions for processor 502. A data storage device 507, such as a magnetic disk or optical disk, is coupled to bus 501 for storing information and instructions.

Computer system 500 may also be coupled via bus 501 to a display device 521, such as a cathode ray tube (CRT), for displaying information to a computer user. An alphanumeric input device 522, including alphanumeric and other keys, is typically coupled to bus 501 for communicating information and command selections to processor 502. Another type of user input device is cursor control 523, such as a mouse, a trackball, or cursor direction keys for communicating direction information and command selections to processor 502 and for controlling cursor movement on display 521.

The present invention is related to the use of computer system 500 to provide methods and systems for routing and/or queueing call center customer interactions or tasks homogeneously across media types. According to one embodiment, the methods according to the present invention are implemented by one or more computer systems 500 in response to processor(s) 502 executing sequences of instructions contained in memory 504. Such instructions may be read into memory 504 from another computer-readable medium, such as data storage device 507. Execution of the sequences of instructions contained in memory 504 causes processor(s) 502 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. For example, media types other than those specifically discussed herein may also be processed within the context of the present invention. Moreover, the generic data structures or objects 202D, 204D, 206D, 208D, 210D, 212D or 214D may include additional functionality or fields not discussed herein. Those of skill in this art will recognize other alternative embodiments and all such embodiments are deemed to fall within the scope of the present invention. Thus, the present invention should be limited only by the claims as set forth below.

What is claimed is:

1. A method for processing a customer interaction of any media type for assignment to at least one selected agent or at least one selected queue coupled to at least one agent, comprising the steps of:

receiving the customer interaction;

extracting customer data from the received customer interaction and linking the customer data with the customer interaction from which the customer data was extracted;

storing the customer data in a data structure that is generic across all media types of the customer interactions;

applying the customer data in the generic data structure to a rule-based engine, the rule-based engine operating upon the extracted customer data to select the at least one agent or the at least one queue to which to assign the generic data structure;

assigning and sending the generic data structure to the at least one selected agent or to the at least one queue;

retrieving the customer interaction linked to the generic data structure, and presenting the retrieved customer interaction to the at least one selected agent.

2. The processing method of claim 1, wherein the incoming customer interaction originates from a group of media types including e-mail, facsimile, telephone, Word Wide Web and written letter.

3. The processing method of claim 1, wherein the applying step causes the rule-based engine to access a repository of agent characteristics, the rule-based engine selecting the at least one agent or the at least one queue by matching the customer data to the agent characteristics.

4. The processing method of claim 3, wherein the agent characteristics include at least one criteria selected from a group including the at least one agent's availability, skill sets, proficiency, languages spoken and experience.

5. The processing method of claim 1, wherein the extracting step extracts customer data by collecting at least one of Interactive Voice Response (IVR) data, Automatic Number Identification (ANI) data, call arrival time, CallerID data, Dialed Number Identification Service (DNIS) when the media type of the received customer interaction is a telephone call.

6. The processing method of claim 1, wherein the extracting step extracts customer data from a Web page accessed by a customer, when the media type of the received customer interaction includes a World Wide Web page.

7. The processing method of claim 1, wherein the extracting step extracts customer data from an email sent by a customer, when the media type of the received customer interaction includes an email.

8. The processing method of claim 1, further comprising the step of accessing customer information based upon the extracted customer data, the customer information being stored in a customer information database.

9. The processing method of claim 8, wherein the customer information database stores at least one of a customer account number, name, contact information, interaction history, level of service to render, payment information and sales information.

10. The processing method of claim 8, wherein the presenting step includes a step of presenting the accessed customer information to the at least one selected agent along with the retrieved customer interaction.

11. The processing method of claim 1, wherein the generic data structure includes at least one field associated with each media type and wherein the storing step selectively populates at least one of said plurality of fields with said extracted customer data.

12. The processing method of claim 1, wherein a task to be performed by at least one agent is substituted for the customer interaction and wherein task data is substituted for the customer data, the agent task thereby being assigned to the at least one selected agent.

13. The processing method of claim 1, wherein the generic data structure is removed from said at least one queue when the retrieved customer interaction is presented to the at least one selected agent.

14. A computer system, comprising:
   at least one processor;
   at least one data storage device;
   a plurality of processes spawned by said at least one processor, the processes including processing logic for processing a customer interaction of any media type for assignment to at least one selected call center agent or at least one selected queue coupled to at least one call center agent in a call center, said processing logic defining the steps of:
   receiving the customer interaction;
   extracting customer data from the received customer interaction and linking the customer data with the customer interaction from which the customer data was extracted;
   storing the customer data in a data structure that is generic across all media types of the customer interactions;
   applying the customer data in the generic data structure to a rule-based engine, the rule-based engine operating upon the extracted customer data to select the at least one agent or the at least one queue to which to assign the generic data structure;
   assigning and sending the generic data structure to the at least one selected agent or to the at least one queue;
   retrieving the customer interaction linked to the generic data structure, and
   presenting the retrieved customer interaction to the at least one selected agent.

15. The computer system of claim 14, wherein the incoming customer interaction originates from a group of media types including e-mail, facsimile, telephone, Word Wide Web and written letter.

16. The computer system of claim 14, wherein the applying step causes the rule-based engine to access a repository of agent characteristics, the rule-based engine selecting the at least one agent or the at least one queue by matching the customer data to the agent characteristics.

17. The computer system of claim 16, wherein the agent characteristics include at least one criteria selected from a group including the at least one agent's availability, skill sets, proficiency, languages spoken and experience.

18. The computer system of claim 14, wherein the extracting step extracts customer data by collecting at least one of Interactive Voice Response (IVR) data, Automatic Number Identification (ANI) data, call arrival time, CallerID data, Dialed Number Identification Service (DNIS) when the media type of the received customer interaction is a telephone call.

19. The computer system of claim 14, wherein the extracting step extracts customer data from a Web page accessed by a customer, when the media type of the received customer interaction includes a World Wide Web page.

20. The computer system of claim 14, wherein the extracting step extracts customer data from an email sent by a customer, when the media type of the received customer interaction includes an email.

21. The computer system of claim 14, wherein the processes further include processing logic for accessing customer information based upon the extracted customer data, the customer information being stored in a customer information database.

22. The computer system of claim 21, wherein the customer information database stores at least one of a customer account number, name, contact information, interaction history, level of service to render, payment information and sales information.

23. The computer system of claim 21, wherein the presenting step includes a step of presenting the accessed customer information to the at least one selected agent along with the retrieved customer interaction.

24. The computer system of claim 14, wherein the generic data structure includes at least one field associated with each media type and wherein the storing step selectively populates at least one of said plurality of fields with said extracted customer data.

25. The computer system of claim 14, wherein a task to be performed by at least one agent is substituted for the customer interaction and wherein task data is substituted for the customer data, the agent task thereby being assigned to the at least one selected agent.

26. A machine-readable medium having data stored thereon representing sequences of instructions which, when executed by a call center computer, causes said computer to process a customer interaction of any media type for assignment to at least one selected agent or at least one selected queue coupled to at least one agent of a call center by performing the steps of:

receiving the customer interaction;

extracting customer data from the received customer interaction and linking the customer data with the customer interaction from which the customer data was extracted;

storing the customer data in a data structure that is generic across all media types of the customer interactions;

applying the customer data in the generic data structure to a rule-based engine, the rule-based engine operating upon the extracted customer data to select the at least one agent or the at least one queue to which to assign the generic data structure;

assigning and sending the generic data structure to the at least one selected agent or to the at least one queue;

retrieving the customer interaction linked to the generic data structure, and presenting the retrieved customer interaction to the at least one selected agent.

27. The machine-readable medium of claim 26, wherein the incoming customer interaction originates from a group of media types including e-mail, facsimile, telephone, Word Wide Web and written letter.

28. The machine-readable medium of claim 26, wherein the applying step causes the rule-based engine to access a repository of agent characteristics, the rule-based engine selecting the at least one agent or the at least one queue by matching the customer data to the agent characteristics.

29. The machine-readable medium of claim 28, wherein the agent characteristics include at least one criteria selected from a group including the at least one agent's availability, skill sets, proficiency, languages spoken and experience.

30. The machine-readable medium of claim 26, wherein the extracting step extracts customer data by collecting at least one of Interactive Voice Response (IVR) data, Automatic Number Identification (ANI) data, call arrival time, CallerID data, Dialed Number Identification Service (DNIS) when the media type of the received customer interaction is a telephone call.

31. The machine-readable medium of claim 26, wherein the extracting step extracts customer data from a Web page accessed by a customer, when the media type of the received customer interaction includes a World Wide Web page.

32. The machine-readable medium of claim 26, wherein the extracting step extracts customer data from an email sent by a customer, when the media type of the received customer interaction includes an email.

33. The machine-readable medium of claim 26, wherein said sequences of instructions further cause said computer to further carry out the step of accessing customer information based upon the extracted customer data, the customer information being stored in a customer information database.

34. The machine-readable medium of claim 33, wherein the customer information database stores at least one of a customer account number, name, contact information, interaction history, level of service to render, payment information and sales information.

35. The machine-readable medium of claim 33, wherein the presenting step includes a step of presenting the accessed customer information to the at least one selected agent along with the retrieved customer interaction.

36. The machine-readable medium of claim 26, wherein the generic data structure includes at least one field associated with each media type and wherein the storing step selectively populates at least one of said plurality of fields with said extracted customer data.

37. The machine-readable medium of claim 26, wherein a task to be performed by at least one agent is substituted for the customer interaction and wherein task data is substituted for the customer data, the agent task thereby being assigned to the at least one selected agent.

38. The machine-readable medium of claim 26, wherein the generic data structure is removed from said at least one queue when the retrieved customer interaction is presented to the at least one selected agent.

* * * * *